Patented Apr. 26, 1949

2,468,722

UNITED STATES PATENT OFFICE 2,468,722

METHOD OF MAKING PENTAERYTHRITOL DEHYDRATION PRODUCTS

Joseph A. Wyler, Allentown, Pa., assignor to Trojan Powder Company, a corporation of New York No Drawing. Application January 10, 1948, Serial No. 1,675

5 Claims. (Cl. 260—338)

This invention relates to the dehydration of pentaerythritols.

In my copending application Serial No. 665,321, filed April 26, 1946, now Patent No. 2,462,047, issued February 15, 1949, I have described heating pentaerythritol with sulfuric or like acid. This heating causes the partial dehydration of the pentaerythritol and at the same time polymerization. The polymerization in fact proceeds so far in cases of vigorous action of the acid that, when the product is later esterified with a fatty drying oil such as talloil in making varnish esters, objectionable jelled masses or fish eyes appear.

With the use of a strong acid in this reaction, the dehydration and polymerization occur simultaneously. As compared to the effect of a weaker acid such as phosphoric, sulfuric acid being stronger produces in a given time more extensive dehydration and a correspondingly larger degree of polymerization.

Contrary to the general rule that dehydration and polymerization in this reaction go hand in hand and one is greater when the other is also greater, my new method described herein produces the desired dehydrating effect while decreasing the extent of the polymerization. I have discovered that heating the selected pentaerythritol with an aromatic sulfonic acid, preferably mixed with phosphoric acid and under the conditions described herein, gives a more rapid dehydrating effect than even the strong sulfuric acid and at the same time less polymerization.

The present invention comprises the method of dehydration of pentaerythritol while minimizing polymerization thereof by heating the pentaerythritol with the aromatic sulfonic acid.

In one embodiment the invention comprises the addition to the sulfonic acid of one of the oxy acids of phosphorus.

As the pentaerythritol selected as the starting material, there is used pentaerythritol itself or the di- or tripentaerythritol. Mixtures of these materials also may be employed.

As the sulfonic acid there is used one of the sulfonic acids of the lower benzene hydrocarbons, that is, of the monocyclic aromatic hydrocarbons. Toluene sulfonic acid is the preferred acid. Others that may be used are benzene sulfonic acid and xylene sulfonic acid.

The oxy acid of phosphorus that is used in one embodiment of the invention is preferably phosphoric acid. Phosphorous acid or metaphosphoric acid may be used but their use is not recommended over that of the more readily available phosphoric acid, the so-called ortho phosphoric.

As to the proportions of the raw materials to each other, these may be varied within wide limits. Of the sulfonic acid I use ordinarily 0.1 to 5 parts for 100 parts of the selected pentaerythritol. In ordinary commercial operations I use about 0.1 to 1 part of the sulfonic acid.

Proportions here and elsewhere herein unless specifically stated to the contrary are expressed as parts by weight.

The oxy acid of phosphorus, when used, is incorporated in the proportion of about 0.1 to 1 part although the proportion may go as high as 5 parts.

Ordinarily the proportion of the acid used is made higher the more severe the dehydration that is to be effected or the less severe the condition of treatment as to temperature and time for a given degree of dehydration required.

The reaction is ordinarily carried on at atmospheric pressure and under an atmosphere of ordinary air. Pressures above or below atmospheric may however be used. A stream of inert gas such as carbon dioxide or nitrogen may also be passed through the reaction mixture to carry off the water liberated in the dehydration reaction.

The temperature of the reaction in which the selected pentaerythritol is dehydrated in contact with the acidic agent is at least as high as the temperature at which water as liberated from the reaction boils out of the mixture. The temperature on the other hand should not be so high as to cause formation of objectionable amounts of by-products. Suitable temperatures are 180° up to 260° or 270° C. For commercial operations I obtain best results in dehydration with a minimum of objectionable polymerization when temperature of heating of the selected pentaerythritol with the acid dehydrating agent is about 215° to 250° C.

The period of heating at the temperature chosen for the reaction is determined by removing specimens from the batch and determining when the degree of dehydration has progressed to the extent desired in the finished product. This involves determination of the remaining hydroxyl content of the heated mixture by a standard method. Once this period of time has been determined for a given set of conditions in the reaction including proportion of the acid and temperature, then other batches may be heated for the predetermined period and the heating discontinued without waiting for the analysis for hydroxyl content to be completed.

The product of the reaction after cooling is a solid. The solid so made is preferably ground to a fine powder and washed with a small amount of a liquid such as cold water or alcohol, the washing liquid being removed as far as possible by filtration or centrifuging. The purpose of this washing is to remove most of the free acid or other readily soluble impurities such as soluble mineral salts. A slight improvement in color usually results also from this washing with a small proportion of the water, alcohol or like material. Ordinarily the product is made to contain about 25% to 40% of hydroxyl groups, this proportion being realized by control of the time of heating and other conditions in the reaction as described above.

For the products to be used with talloil and other drying oil acids in making varnish esters I ordinarily discontinue the heating when the hydroxyl content is found to be 27 to 33% of the finished dehydrated pentaerythritol.

It is considered that the mechanism of my reaction is first dehydration of two adjacent hydroxyl groups to form an ether group and the subsequent reaction of the hydroxy ether thus formed with additional molecules of the selected pentaerythritol. When the selected pentaerythritol is the monomer a series of reactions which are considered to represent the changes which I produce are illustrated by the following chemical equations:

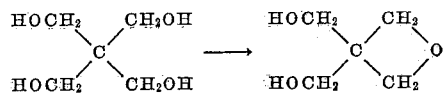

followed by polymerization to

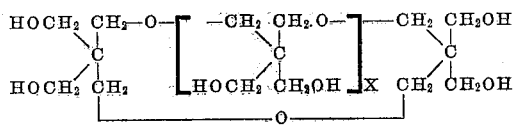

in which X is any number beginning with 0 and ending with 7.

Objectionable polymerization and formation of undesired by-products is considered to be due in part to further dehydration as, for instance, to the splitting out of water from an ether group such as that shown in the first reaction above, with the development of double bonds between the two carbons which in the reaction are shown as joined in the ether linkage.

The invention will be further illustrated by description in connection with the following examples:

Example 1

199.6 parts of pentaerythritol, C(CH₂OH)₄, of M. P. 252° C. were placed in a suitable heating vessel provided with mechanical stirring, treated with 0.4 part of p-toluenesulfonic acid, and the mixture heated and stirred, to obtain a uniform mixture. The latter was heated to 235° C. where the mixture boiled vigorously, with the evolution of water. After 15 minutes at this temperature, the molten mass was run into pans to solidify.

The product, upon cooling, was only slightly colored. Upon pulverization and analysis, it was found to contain 31.26% OH as against 49.50% OH for the pentaerythritol used.

The water liberated was slightly in excess of 9% of the weight of the pentaerythritol used.

When this product was used in a tall-oil-rosin-linseed oil esterification reaction under carefully controlled, standard conditions the time required for this esterification mixture to body to an "E" (125 C. P. S.) viscosity for a 50% solution of the ester in mineral spirits was 6 hours, whereas the original pentaerythritol itself required 18–20 hours to reach an "E" viscosity.

Example 2

Using a mixture of pentaerythritol and toluenesulfonic acid identical with that of Example 1, but carrying out the heating until a temperature of 248° C. was reached, a total of 11% of water was driven off. This required 15 minutes after the beginning of water evolution. The product contained 32.10% OH and produced, under standard conditions with the esterification mixture of Example 1, an "E" viscosity resin in 5 hours. It will be noted that increasing the temperature improved the bodying property of the product.

Example 3

Carrying out an experiment in a manner identical with Example 2 except that the reaction batch was held at 248° C. until 13% of water had been driven off, I obtained a product which contained 27.90% OH and produced an "E" viscosity resin, under the standard conditions, in 4½ hours.

Example 4

A duplicate of Example 3 was run except that 15% of water was removed instead of the 13%. The product thus obtained was not satisfactory. It was dark in color, sticky and rubbery and of an entirely different nature than that produced in the other examples.

Example 5

Using a mixture consisting of 99.5% pentaerythritol (250° C. M. P.) and 0.5% of toluenesulfonic acid and heating to 200° C. I obtained a rapid evolution of water. The temperature was maintained at 210° C. until 13% of water had been driven over. This required about 30 minutes at 210° C.

The final product contained 29.25% OH and produced an "E" viscosity resin in 6 hours.

If more toluenesulfonic acid is used than the proportions indicated, the evolution of water takes place at a lower temperature (even as low as 180° C.) and the rate of evolution, for a given temperature, may be considerably increased.

Example 6

199.6 parts of pentaerythritol (250° C. M. P.) were mixed with 0.4 part of p-benzene sulfonic acid dissolved in 10 parts of water and the mixture heated in the same manner as in Example 1.

The mixture started to melt at 215° C. and began to liberate water at 225° C. At 240° C. the rate of water liberation was satisfactory and the mixture was held at this temperature for 45 minutes. 13% of water was liberated by this procedure and the hydroxyl content of the product was found to be 33.50% OH.

This product also produced excellent bodying when esterified as described above.

Example 7

Using p-xylene sulfonic acid in substantially the same manner as the p-benzene sulfonic acid of the previous example, it was found that a temperature of 285° C. was required to effect the release of water and that at this temperature a product was obtained which was almost black in color and was not useful in esterification reactions.

The examples given above are confined to the use of the aryl sulfonic acids without admixture with any of the oxygen acids of phosphorus.

My work has shown that the sulfonic acids mentioned above are more satisfactory agents for removing water from the pentaerythritols than are the acids like sulfuric; that is, the water is evolved much more rapidly and the process is more controllable, to give a uniform product. The sulfonic acids themselves do not have as great a polymerizing or condensing action upon the dehydration products as do the oxygen acids of sulfur, and therefore are not as prone to cause overpolymerization.

In the following examples are given the details of other modes of applying my invention.

*Example 8*

595.8 parts of pentaerythritol (M. P. 250° C.) were mixed with 1.2 parts of toluenesulfonic acid, 3 parts of phosphoric acid and 10 parts of water and the mixture heated with stirring. The 10 parts of added water were soon driven out and when the batch reached 215° C. the pentaerythritols give a vigorous evolution of water. This water came out of the pentaerythritol molecule.

The temperature of the reacting mixture was held at 214° to 216° C. for 75 minutes. A portion of the batch was then removed, cooled and pulverized.

A total of 10% of water, based upon the weight of the pentaerythritol, was driven out of the pentaerythritol molecule.

The final product contained 31.33% OH and had a good color. When used to prepare a resin in accordance with the standardized procedure it produced an "E" viscosity (50% solution in mineral spirits) in 10 hours.

It should be noted that a relatively low temperature was used in this example. Also, the presence of phosphoric acid caused the mixture to melt at as low a temperature as 180° C., thus improving the ease of operating the process.

*Example 9*

As stated in Example 5, a portion only of the reaction mixture was removed and tested. The portion remaining in the vessel was heated, with stirring, for 60 minutes additional at 180° C. and a second portion of the liquid contents removed for tests. This second portion contained 29.95% OH and produced an "E" viscosity resin in 6½ hours.

*Example 10*

The portion of reaction mixture of Example 9 still remaining in the vessel was further heated with stirring for 60 minutes longer, at 180° C. and the product tested as mentioned above. It contained 27.58% OH and produced an "E" viscosity resin in 5¾ hours.

All resins produced clear, free flowing 50% solutions in mineral spirits.

*Example 11*

In a series of tests similar to those given in Examples 9 and 10 except that the reaction temperature for the dehydration step was promptly lowered to 200° C., as soon as the water had started to be released at 215° C. and then held at 200° C., and the mixture otherwise processed as shown in Examples 9 and 10, the products produced were progressively better-bodying agents for resins, but not quite as good as those produced at 215° C., showing that 215° C. is preferable to 200° C.

*Example 12*

The procedure of any of the Examples 1 to 11 is repeated except that dipentaerythritol is substituted on a pound for pound basis for the pentaerythritol.

*Example 13*

The procedure of any of the Examples 1 to 11 is repeated except that tripentaerythritol is substituted on a pound for pound basis for the pentaerythritol.

It will be understood that it is intended to cover all changes and modifications of the examples of the invention herein chosen for the purpose of illustration which do not constitute departures from the spirit and scope of the invention.

What I claim is:

1. The method of dehydrating a pentaerythritol selected from the group consisting of pentaerythritol, dipentaerythritol and tripentaerythritol which comprises forming a mixture of the selected pentaerythritol with the sulfonic acid of a monocyclic aromatic hydrocarbon in the proportion of 0.1 to 5 parts for 100 parts of the selected pentaerythritol and heating the mixture at a temperature between that at which water begins to boil out and 270° C., separating water as liberated during the said heating, and discontinuing the heating when the hydroxyl content of the resulting partially dehydrated pentaerythritol falls to a value within the range of 25% to 40% of the weight of the partially dehydrated pentaerythritol.

2. The method described in claim 1, the proportion of the said sulfonic acid being 0.1 to 1 part for 100 parts of the pentaerythritol and the temperature of heating being 215° to 260° C.

3. The method described in claim 1, the said sulfonic acid being toluene sulfonic acid.

4. The method of dehydrating a pentaerythritol selected from the group consisting of pentaerythritol, dipentaerythritol and tripentaerythritol which comprises forming a mixture of the pentaerythritol with the sulfonic acid of a monocyclic aromatic hydrocarbon in the proportion of 0.1 to 5 parts for 100 parts of the pentaerythritol and heating the mixture at a temperature of 180° to 270° C., separating water as liberated during the said heating, and discontinuing the heating when the hydroxyl content of the resulting partially dehydrated pentaerythritol falls to a value within the range 25% to 40% of the weight of the partially dehydrated pentaerythritol.

5. The method of dehydrating a pentaerythritol selected from the group consisting of pentaerythritol, dipentaerythritol and tripentaerythritol which comprises forming a mixture of the selected pentaerythritol with the sulfonic acid of a monocyclic aromatic hydrocarbon in the proportion of 0.1 to 5 parts for 100 parts of the pentaerythritol and an acid selected from the group consisting of phosphoric, phosphorous and metaphosphoric acid in the proportion of 0.1 to 5 parts of the phosphorus-containing acid for 100 parts of the pentaerythritol, heating the mixture at a temperature between that at which water begins to boil out and 270° C., separating water as liberated during the said heating, and discontinuing the heating when the hydroxyl content of the resulting partially dehydrated pentaerythritol by analysis falls to 25% to 40%.

JOSEPH A. WYLER.

No references cited.